United States Patent
Gradeff et al.

[15] 3,689,570
[45] Sept. 5, 1972

[54] MONOALKYLATION OF UNSUBSTITUTED DIHYDRIC PHENOLS WITH LOWER ALKYL CHLORIDES USING ALKALI METAL CARBONATES OR BICARBONATES AS A CONDENSING AGENT

[72] Inventors: Peter S. Gradeff, Forest Lakes, Andover, N.J. 07821; Claude Bertrand, 4 Gifford Road, Somerset, N.J. 08873

[22] Filed: Jan. 14, 1970

[21] Appl. No.: 2,951

Related U.S. Application Data

[63] Continuation-in-part of Ser. No. 800,700, Feb. 19, 1969.

[52] U.S. Cl. ............................................. 260/613 D
[51] Int. Cl. ................................................ C07c 43/22
[58] Field of Search .................................. 264/613 D

[56] References Cited

UNITED STATES PATENTS 2,067,960   1/1937   Werntz .............. 260/613 D X

OTHER PUBLICATIONS

Organic Syntheses, Coll Vol. IV., John Wiley & Sons Inc., New York, 1963, pp. 836–838

*Primary Examiner*—Howard T. Mars
*Attorney*—Janes & Chapman

[57] ABSTRACT

Unsubstituted dihydric phenols are alkylated with lower alkyl chlorides having a comparatively low reactivity in the presence of alkali metal carbonates or bicarbonates as a condensing agent. The reaction proceeds at moderate temperatures, and gives high yields of the monoalkylated phenols, ranging up to 98 percent, with dialkylation suppressed to below 3 percent.

12 Claims, No Drawings

MONOALKYLATION OF UNSUBSTITUTED DIHYDRIC PHENOLS WITH LOWER ALKYL CHLORIDES USING ALKALI METAL CARBONATES OR BICARBONATES AS A CONDENSING AGENT

This application is a continuation-in-part of U.S. Ser. No. 800,700, filed Feb. 19, 1969.

A number of procedures have been proposed for the monoalkylation of unsubstituted dihydric phenols, such as catechol (pyrocatechol), resorcinol, and hydroquinone, using alkyl halides. German pat. No. 591,534 to Max and Lehmann, dated 1934, describes the reaction of monosodium salts of catechol with alkyl chlorides in the presence of a solvent such as benzene, toluene, xylene and chlorobenzene. Seventy five to 76 percent yields are reported in the working Examples of the patent.

U.S. Patent No. 2,024,534 to Marx, Wersche and Bittner, dated Dec. 17, 1935, describes the reaction of an alkyl halide with an anhydrous alkaline earth metal salt of catechol, in suspension in an organic solvent. The barium salt is preferred.

Spanish pat. No. 211,123, dated Oct., 1953, describes the conversion of the sodium salts of catechol, using a two-step procedure. First, an aqueous methanol solution of the sodium salt of catechol and one mole equivalent of methyl chloride are heated in an autoclave at 120°C. An additional 0.4 mole equivalent of methyl chloride and an alkali are added, and then the mixture is brought to reflux, giving a 5:4:1 ratio of the monoether of catechol, diether of catechol, and unreacted catechol.

N.Z. Sharp et al. *MASLOB ZHNr. Prom.* 28(4) 35–7 (1962) describe the preparation of the ethyl ether of pyrocatechol and resorcinol by dissolving the phenols in concentrated sodium hydroxide solution, and reacting the solution with ethyl chloride in an autoclave for two hours at 100°C.

U.S. pat. No. 2,781,404, dated Feb. 12, 1957, to Rosenwald, describes the alkylation of hydroquinone followed by etherification. The etherification is carried out using reagents such as dimethyl sulfate and methyl iodide, in the presence of sodium hydroxide.

U.S. pat. No. 3,274,260, dated Sept. 20, 1966, of Levy and Friedman, reacts hydroquinone, resorcinol and catechol in aqueous sodium hydroxide solution, employing dimethyl and diethyl sulfates, or an alkyl halide, in the presence of an inert water-immiscible solvent for the monoalkyl ether of the phenol, in the proportion of from 4 to 8 parts of solvent per part by weight of dihydric phenol. The reaction is carried out at from 65° to 100°C., and the alkali metal hydroxide solution is gradually added to the heated mixture, in the presence of the alkylating agent, after which the monoalkyl ether of the dihydric phenol is separated from the reaction mixture.

Laskina et al. *Tr. VSES. NAUCHN. Issled, Iust. Sinetich.* 6, 31–7 (1963) describe the reaction of pyrocatechol and allyl chloride in anhydrous acetone with sodium iodide and sodium carbonate to produce the monoallyl ether of pyrocatechol, in a 75 percent yield. The sodium iodide is essential for a good yield, inasmuch as without the sodium iodide, using propyl alcohol as the solvent, the yield was 43 percent, whereas in the presence of sodium iodide, the yield was 68 percent. In ethylene glycol as the solvent, the yield was 46 percent with sodium iodide and 43 percent without sodium iodide.

*Organic Syntheses Collective Volume IV*, page 836, describes the reaction of 2', 5'-dihydroxyacetophenone, with methyl iodide and potassium carbonate under anhydrous conditions, in the presence of acetone as a solvent. The anhydrous potassium carbonate is added, followed by the methyl iodide, and the mixture is refluxed for about 6 hours. A 55 to 65 percent yield of 2'-hydroxy-5'-methoxy-acetophenone is obtained.

In all of these procedures where alkali metal carbonates are used, the carbonate must be anhydrous, and the solvent must also be anhydrous. Moreover, a halide of comparatively high reactivity, i.e., an allyl halide or an alkyl iodide, must be employed. Furthermore, it is accepted that replacement of the acetone with a non-polar solvent such as benzene results chiefly in C-alkylation (Fieser and Fieser, *Advanced Organic Chemistry*, p. 769 and also *Organic Reactions*, Vol. II, p. 20.

In accordance with the invention, unsubstituted dihydric phenols, i.e., catechol (pyrocatechol, o-dihydroxybenzene), resorcinol, (m-dihydroxybenzene) and hydroquinone (p-dihydroxybenzene) are monoalkylated using an alkyl halide of relatively low activity, a lower alkyl chloride, in the presence of an alkali metal carbonate or bicarbonate. The lower alkyl chloride can be used in relatively large amounts, well beyond the amounts stoichiometrically required for the monoalkylation, in which case the alkyl chloride can also serve as the solvent. Surprisingly, while the reaction proceeds in the absence of water, it is advantageous to add water, and the amount of water used can be rather large, ranging from about 3 moles per mole of the phenol upwards to as much as 20 moles per mole of phenol. The reaction proceeds at moderate temperatures, in a relatively short reaction time, and produces the monoalkyl ether in high yield, with very little dialkylated ether.

It was surprising, furthermore, to find that replacement of the acetone with toluene, for example, did not hinder the O-alkylation but on the contrary resulted in much better yields. Although the reaction will proceed in the absence of a solvent, it is preferable to use one. Aromatic hydrocarbons such as toluene, benzene and xylene are used with success. So also are petroleum hydrocarbons of the aliphatic and cycloaliphatic type, such as octane, hexane, heptane, cyclohexane, cyclopentane, and cycloheptane. Equally good results are obtained with the use of halogenated hydrocarbons such as dichloroethylene and propylene dichloride, and mixtures of aromatic hydrocarbons and aliphatic alcohols such as mixtures of toluene and methanol. Ketones such as acetone and diethylketone also can be used, but surprisingly, as shown, results are not as good. Other solvents that can be used will be apparent to those skilled in this art from the foregoing description.

The reaction is applicable to any dihydroxy benzene, i.e., catechol, resorcinol and hydroquinone, as noted above. The lower alkyl chlorides as a class, in which the alkyl has from one to five carbon atoms, are effective. Methyl and ethyl chlorides are preferred, but propyl, isopropyl, butyl, isobutyl, tertiary-butyl, tertiary-amyl, secondary-amyl, isoamyl, and amyl chlorides can also be used.

In monoalkylation, the reactants combine in stoichiometrically equal amounts. An excess of either the dihydric phenol or the alkyl chloride can be employed. The alkyl chloride can be used in a considerable excess, if desired, and if a sufficient amount is used, the alkyl chloride also can serve as a solvent for the reaction.

Although the reaction will proceed in an anhydrous reaction medium, it is not necessary to maintain the reaction medium anhydrous, and in fact, it is advantageous in many instances to add water, preferably in a substantial amount. The amount of water should be at least about 0.5 mole per mole of the phenol, to obtain the beneficial effect of the water, and can range to as much as 20 moles per mole of the phenol. Preferably, the amount of water is within the range from about 3 to about 4 moles per mole of phenol.

If the proportions of the phenol and alkyl chloride are mole-to-mole, the stoichiometric amount of alkali metal carbonate is 0.5 mole, but usually the amount employed is within the range of about 0.5 to about 1 mole per mole of phenol. Twice this amount of the alkali metal bicarbonate can be substituted for the alkali metal carbonate, and mixtures of alkali metal carbonate and bicarbonate can also be used, in amounts appropriate to this stoichiometric ratio. Any alkali metal carbonate can be used, but sodium carbonate and bicarbonate and potassium carbonate and bicarbonate are preferred.

The reaction proceeds at temperatures within the range from about 50° to about 150°C., and preferably from about 110 to about 130°C. In view of the low boiling point of the lower alkyl chlorides, the reaction is best carried out in an autoclave. The resulting pressure depends upon the reaction conditions; solvent, ratio of ingredients and mostly temperature.

The reaction proceeds rather quickly, more rapidly at elevated temperatures than at lower temperatures, within the stated range. Usually, the reaction is complete within about 4 to about 25 hours.

In a related study of O-alkylation of phenols using alkyl halides and allyl halides in particular, it has been found that addition of 1 to 5 percent of an amine to the mixture permits a more complete reaction. An amine such as triethanolamine, diethanolamine, triethylamine, diethylamine acts therefore as a catalyst. The reason of such a catalytic action of amine in O-alkylation of phenols as well as the extent of the utility of this finding is not known at present, but we have found advantage in adding amines in some cases as indicated in the Examples.

If the reaction is carried out under the conditions stated, it is to be expected that yields of the monoalkylated product will be 80 percent and higher, ranging from 95 to 98 percent under optimum conditions. Moreover, dialkylation is suppressed, and the yield of dialkylated product under optimum conditions is in the range of 1 to 3 percent.

The following Examples in the opinion of the inventors represent preferred embodiments of the invention.

EXAMPLE 1

In a 1 liter stainless steel autoclave was charged 110 grams of pyrocatechol, 92.4 grams sodium bicarbonate, 92.4 grams water, 300 cc. toluene, 5 grams triethanolamine and 65 grams ethyl chloride. The reactor was heated, with constant agitation, and the temperature of the reaction mixture brought to and maintained at 110°C. for 18 hours. The initial pressure at 110°C. was noted as 150 psi., and the pressure reached 250 psi. after the 18 hours, due to the liberation of carbon dioxide in the course of the reaction. After cooling of the autoclave to room temperature, release of the carbon dioxide and unreacted ethyl chloride, separation of organic materials, and distillation, the percentage of pyrocatechol in the distillate was 33 percent, monoethoxy-o-phenol 66 percent and diethoxybenzene 1 percent.

EXAMPLE 2

In a one liter stainless steel autoclave was charged 1 mole pyrocatechol (110 g.), 0.6 mole sodium carbonate (78 g.), 45 grams water, 300 cc. toluene, 5 grams triethanolamine and 1.04 mole ethyl chloride. The temperature of the reaction mixture was brought to and held at 130°C. for 9 hours. After cooling, release of carbon dioxide and unreacted ethyl chloride, separation of the organic material and distillation, the yield of quaethol recovered, based on the amount of pyrocatechol consumed, was 92 percent of theoretical, and the ratio of monoalkylation to dialkylation was 98:2.

EXAMPLE 3

Pyrocatechol 121 grams (1.1 moles) sodium carbonate, soda ash, 65 grams (0.5 mole), triethylamine 5 grams, toluene 500 cc. and 50.5 grams methyl chloride were charged in a one liter stainless steel autoclave. The reaction mixture was then brought to and heated at 130°C. for 21 hours, with agitation. After cooling and release of the carbon dioxide and unreacted methyl chloride, the solids were filtered, and the organic portion distilled. The distillate analyzed pyrocatechol 13.5 percent, guaiacol 84.5 percent and dimethoxy benzene 2.0 percent. The yield of guaiacol was 95 percent, based on the amount of pyrocatechol consumed.

EXAMPLE 4

Sodium carbonate 0.7 mole, one mole pyrocatechol, 1 mole ethyl chloride, 50 grams of water, 2 grams of triethylamine and 300 cc. of toluene were reacted in a 1 liter stainless steel autoclave for 8 hours at 110°C. After cooling, release of the carbon dioxide, separation of the organic materials and distillation, the yield of guaethol recovered was 97 percent of theory, and the ratio of monoalkylation to dialkylation was 97.5:2.5

EXAMPLE 5

One mole of sodium carbonate, one mole of pyrocatechol, one mole methyl chloride, 40 grams of water, and 500 cc. of toluene were charged to a 1 liter stainless steel autoclave, and heated under agitation in the autoclave for 6 hours at 110°C. After cooling, release of the carbon dioxide and unreacted ethyl chloride, separation of the organic material, and distillation, the yield of guaiacol was 91 percent, based on the amount of pyrocatechol consumed. The main cut of the distillate analyzed as follows: guaiacol 98.1 percent, veratrol 1.1 percent and pyrocatechol 0.8 percent.

EXAMPLE 6

Heptane 300 cc. and sodium carbonate 0.6 mole, and 45 grams of water were charged together with 1 mole pyrocatechol and 1 mole methyl chloride into a one liter stainless steel autoclave. With constant agitation, the contents of the reactor were brought to 130°C., and kept at 130°C. for 10 hours. After cooling, release of carbon dioxide and unreacted methyl chloride, separation of the organic material, and distillation, the yield of guaiacol based on pyrocatechol consumed was found to be 91 percent.

EXAMPLE 7

Heptane 300 cc and sodium carbonate 0.6 mole were charged together with 1 mole pyrocatechol and 1 mole methyl chloride into a one liter stainless steel autoclave. With constant stirring, the reaction mixture was brought to 130°C. and heated at 130°C. for 4 hours. After cooling, release of carbon dioxide and unreacted methyl chloride, separation of the organic material and distillation, the yield of guaiacol was found to be 93.5 percent, and the amount of veratrol was 4.5 percent.

EXAMPLE 8

Sodium carbonate 0.6 mole, 1 mole pyrocatechol, and 5 moles of methyl chloride were charged together with a 1 liter stainless steel autoclave. The reaction mixture with constant agitation was then brought to 130°C., and heated at 130°C. for 4 hours. The yield of guaiacol based on the pyrocatechol consumed was found to be 90 percent, with 7.5 percent of veratrol.

EXAMPLE 9

Dichloroethylene 300 cc., sodium carbonate 0.6 mole and 45 grams of water were charged together with one mole of pyrocatechol and 1 mole of methyl chloride to a 1 liter stainless steel autoclave. With constant stirring, the reaction mixture was brought to 130°C. and was held at 130°C. for 10 hours. After cooling, venting of carbon dioxide, separation of organic material and distillation, the yield of guaiacol was found to be 95 percent, with 2 percent of veratrol.

EXAMPLE 10

Dichloroethylene 300 cc., sodium carbonate 0.6 mole, 1 mole of pyrocatechol and 1 mole methyl chloride were charged together into a 1 liter stainless steel autoclave. Then, with constant stirring, the reaction mixture was brought to 130°C., and heated at 130°C. for 10 hours. After cooling, venting of carbon dioxide, separation of organic material, and distillation, the yield of guaiacol was found to be 90 percent, and the ratio of monoalkylation to dialkylation was found to be 95:5.

EXAMPLE 11

Diethyl ketone 300 cc., 0.6 mole sodium carbonate, 45 grams of water, 2.5 grams of triethanolamine, 1 mole of pyrocatechol and one mole of methyl chloride were charged together into a 1 liter stainless steel autoclave. The reaction mixture was then brought to 130°C., with constant stirring, and maintained at this temperature with stirring for ten hours. After cooling, venting of carbon dioxide and unreacted methyl chloride, separation of organic material, and distillation, a distillate was obtained which analyzed as follows:

| | |
|---|---|
| Pyrocatechol | 21.4% |
| Guaiacol | 71.5% |
| Veratrol | 7.1% |

EXAMPLE 12

Toluene 250 cc., methanol 100 cc., sodium carbonate 0.6 mole, triethanolamine 5 g., 1 mole ethyl chloride and one mole of pyrocatechol were charged into a one liter stainless steel autoclave. The reaction mixture was then brought to 125°C., with constant stirring, and heated at this temperature, with continued stirring, for 7 ½ hours. The autoclave was then cooled and vented to separate carbon dioxide and unreacted ethyl chloride. The organic material was separated, and then after distillation, the yield of guaethol was found to be 92 percent of theory, with the ratio of guaethol: diethoxybenzene 96:4.

EXAMPLE 13

Hydroquinone 1 mole, sodium bicarbonate 1.1 moles, water 62 grams, toluene 300 cc., and methyl chloride 1 mole, were charged together into a 1 liter stainless steel autoclave. Then, with constant stirring, the reaction mixture was brought to 120°C., and maintained at this temperature with stirring for 5 ½ hours. The reaction mixture was cooled, the carbon dioxide and unreacted methyl chloride released, the organic layer separated, the aqueous solution extracted, and the combined residue was flash-distilled. The distillate composition was found upon analysis to be hydroquinone 32 percent, monomethyl hydroquinone ether 63.0 percent, and 1,4-dimethoxybenzene 5.0 percent.

EXAMPLE 14

Potassium carbonate 0.6 mole, 55 grams of water, 300 cc. toluene, 110 grams hydroquinone and 50.5 grams methyl chloride were charged to a 1 liter stainless steel autoclave. The mixture, with constant stirring, was then brought to 120°C., and held at this temperature for 8 hours. The reaction mixture was then cooled. The carbon dioxide and unreacted methyl chloride were vented, the organic layer separated, the aqueous solution extracted, and the combined residue flash-distilled. The composition of the distillate was found upon analysis to be hydroquinone 31 percent, monomethyl ether of hydroquinone 65 percent and dimethyl ether of hydroquinone 4 percent.

EXAMPLE 15

Resorcinol 1 mole, sodium carbonate 0.6 mole, 45 grams of water, 5 grams triethanolamine, 300 cc. of toluene and 1 mole methyl chloride were charged to a 1 liter stainless steel autoclave. The reaction mixture was heated with stirring to 50°C. The heat liberated in course of the reaction raised the temperature of the reaction mixture to 90°C. during the following 30 minutes. The heater was then set for 83°C., and reaction continued at this temperature, with continued stirring, for an additional 10 hours. The reaction mixture was then cooled, carbon dioxide and unreacted methyl chloride vented, the aqueous solution extracted, and the organic layer separated, and the combined residue flash-distilled. The composition of the distillate was found upon analysis to be: resorcinol 40.5 percent, monomethyl ether of resorcinol 55.5 percent and dimethyl ether of resorcinol 4.0 percent.

EXAMPLE 16

Resorcinol one mole, sodium carbonate 0.6 mole, 45 grams of water, 5 grams of triethanolamine, 300 cc. of cyclohexane, and one mole of ethyl chloride were charged into a one liter stainless steel autoclave. The reaction mixture was then brought to 50°C., with stirring. The exothermic heat of reaction then increased the temperature to 90°C. during the following 30 minutes. The heater was set for 83°C., and reaction continued at this temperature for an additional 10 hours. The reaction mixture was cooled, the carbon dioxide and unreacted ethyl chloride vented, the organic layer separated, the aqueous solution extracted, and the combined residue flash-distilled. The composition of the distillate was then analyzed, and the yields obtained were as follows: resorcinol 40.5 percent, monoethyl ether of resorcinol 55.5 percent, diethyl ether of resorcinol 4.0 percent, and the ratio of monoalkylation to dialkylation was 97:3.

Having regard to the following disclosure, the following is claimed as the inventive and patentable embodiments thereof:

1. A process for the monoalkylation of unsubstituted dihydric phenols, which comprises reacting the unsubstituted dihydric phenol with a lower alkyl chloride in the liquid phase at a temperature within the range from about 50° to about 150°C. under a pressure sufficient to retain the alkyl chloride in the reaction mixture in the presence of an alkali metal carbonate in an amount within the range from about 0.5 to about 1 mole per mole of phenol or alkali metal bicarbonate in an amount within the range from about 1 to about 2 moles per mole of phenol and separating the monoalkyl phenol ether reaction product.

2. A process in accordance with claim 1 in which the dihydric phenol is catechol.

3. A process in accordance with claim 1 in which the dihydric phenol is resorcinol.

4. A process in accordance with claim 1 in which the dihydric phenol is hydroquinone.

5. A process in accordance with claim 1 in which the lower alkyl chloride is used in a large amount, well beyond the amount stoichometrically required for the monoalkylation, so that the alkyl chloride also serves as the solvent.

6. A process in accordance with claim 1 in which the reaction mixture is anhydrous.

7. A process in accordance with claim 1 in which the reaction mixture contains water in an amount within the range from about 0.5 mole per mole of the phenol up to 20 moles per mole of the phenol.

8. A process in accordance with claim 1 in which the alkyl chloride is methyl or ethyl chloride.

9. A process in accordance with claim 1 in which the reaction is carried out in the presence of an inert organic solvent, in an amount to suppress dialkylation below 3 percent.

10. A process in accordance with claim 1 in which the proportions of the phenol and alkyl chloride are mole-to-mole and the carbonate is an alkali metal carbonate.

11. A process in accordance with claim 1 in which the proportions of the phenol and alkyl chloride are mole-to-mole and the carbonate is an alkali metal bicarbonate.

12. A process in accordance with claim 1, in which the alkali metal carbonate is sodium carbonate or bicarbonate, or potassium carbonate or bicarbonate.

* * * * *

15-008 CIP

PO-1050 (5/69)

UNITED STATES PATENT OFFICE
CERTIFICATE OF CORRECTION

Patent No. 3,689,570              Dated September 5, 1972

Inventor(s) Gradeff et al.

It is certified that error appears in the above-identified patent and that said Letters Patent are hereby corrected as shown below:

Face Page, following Item [72]   :   Add -- [73] Assignee: Rhodia Inc., New York, New York --

Column 1, line 45   :   "of" should be -- to --

Column 4, line 22   :   "coding" should be -- cooling --

Signed and sealed this 1st day of May 1973.

(SEAL)
Attest:

EDWARD M. FLETCHER, JR.
Attesting Officer

ROBERT GOTTSCHALK
Commissioner of Patents